3,351,290
LAWN TREATING SYSTEM
Edward K. Baldwin, 10371 Rossbury Place,
Los Angeles, Calif. 90064
Filed Apr. 13, 1966, Ser. No. 542,295
2 Claims. (Cl. 239—276)

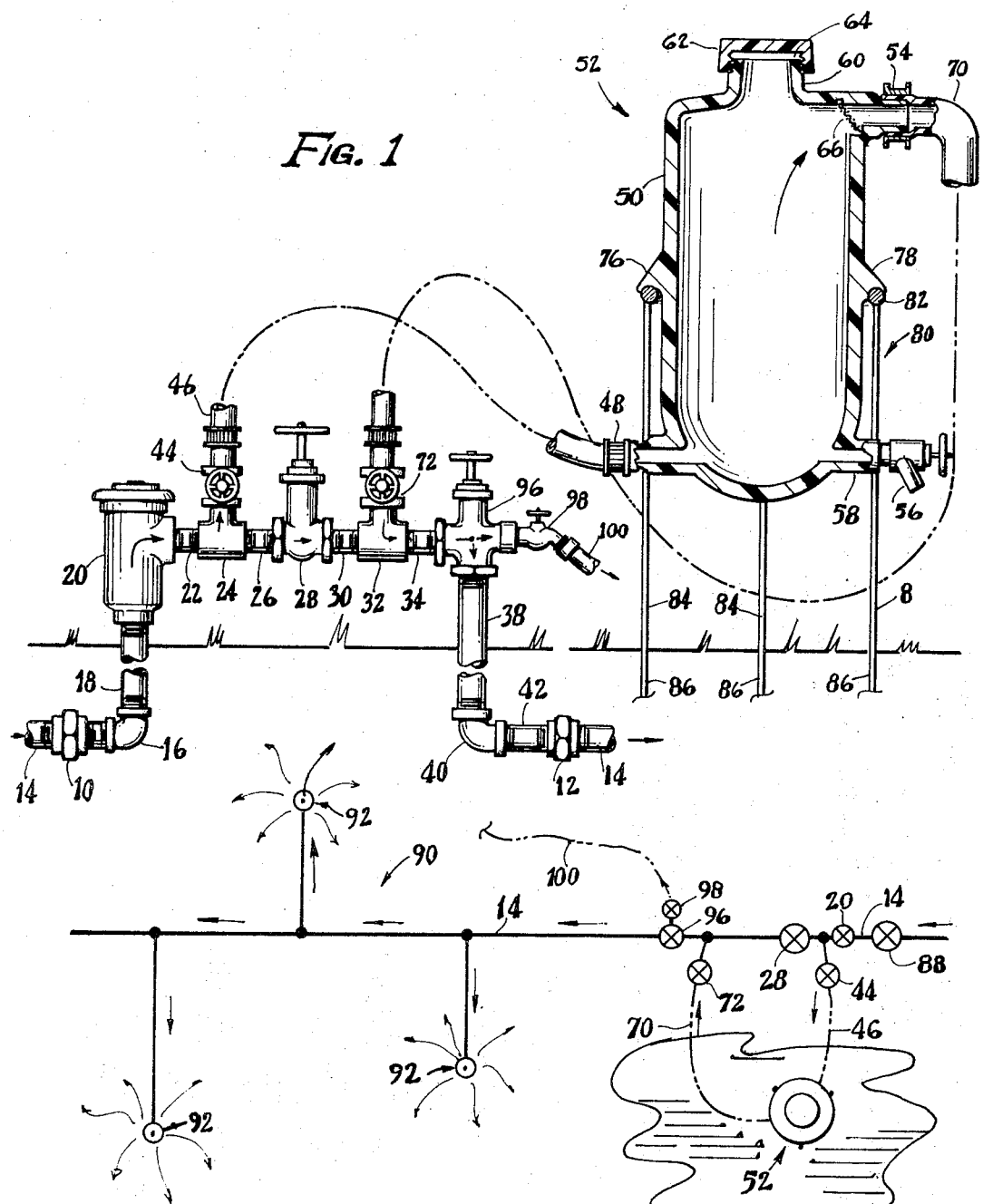

ABSTRACT OF THE DISCLOSURE

The application discloses a lawn and shrub treatment system for spraying fertilizers and other chemicals utilizing a new or existing sprinkler system. A throttling valve is installed in series with the main shut-off for the sprinkler network or a predetermined branch thereof. In shunt with the throttling valve is coupled, by flexible lines, a mixing tank for dissolving and introducing chemicals into the by-pass water flow. The mixer tank is fed into at its bottom from ahead of the throttling valve; and its top is coupled back into the sprinkler network downstream of throttling valve. The tank is transparent and is removably mounted on a ringstand structure.

---

This invention relates generally to the treating of lawn areas with chemicals, fertilizers, fungicides, pesticides, insecticides and weed killers and more particularly to systems for automatically distributing such substances over the lawn with the utilization therewith of a conventional sprinkling network as a component of the system.

This application is a continuation-in-part of my co-pending, now abandoned, application, Ser. No. 514,081, filed Dec. 15, 1965.

Although the present invention finds particularly advantageous utilization in the field of residential lawn maintenance and although in the cause of brevity and clarity of presentation, much of the following discussion of examples of the invention are directed thereto, it is to be understood that the advantages of the invention are equally well manifest in other fields where automatic distribution of chemicals through a water sprinkling system is desirable, such as, for example, in the treatment of large municipal or industrial lawns and certain commercial crops as well as in the treatment of domestic plants such as shrubs and small trees.

The proper application of chemicals, such as mentioned above, to lawns has become, particularly in recent years, a relatively difficult and tedious task, especially for the average surburban homeowner. The conventional standards for healthy, well-maintained year-round lawns have developed side by side with the advent of the development of extremely effective chemicals for achieving and maintaining such lawns. The state of the art currently is that, substantially irrespective of the particular conditions of soil, climate, insect infestations or other such problems, which in previous years precluded beautiful lawns in many cases, anyone can achieve healthy and beautiful lawn areas by the application thereto of the proper weed killers, insecticides, fertilizers, soil conditioners, pest repellants or fungicides in the proper concentrations and amounts, properly mixed and/or washed with water, and applied in the proper distribution over the prescribed areas at the proper time.

Depending upon the particular conditions involved, some of the above criteria are critical whereby application of the substance in a manner not precisely in accord therewith may be either severely destructive of the lawn or be a totally useless or ineffective effort. For example, some of the most effective and desirable fertilizers can severely and irreparably burn the lawn if applied in an improper concentration and if not washed off the plants after the application thereof to the lawn. Similarly weed killers may be either deleterious, beneficial or totally useless depending upon the concentration with respect to the water with which they are mixed and distributed.

Other problems not directly associated with the above technical aspects of lawn maintenance are at least equally pertinent to achieving and maintaining a beautiful lawn. They involve the normal reluctance of the homeowner (1) to handle the strong chemicals, (2) become involved in the hard work and mess of hand sprinkling the mixed chemicals over the lawn, and (3) to experience the uncertainty of whether the distribution was an even one and was properly washed off the plants, et cetera.

As a consequence, it is noted that the majority of home-owners compromise the achievable condition of their lawns because of their lack of confidence in whether they can do proper lawn treating and other treating and because of the work, expense and mess involved in such lawn maintenance by conventional techniques.

It is accordingly a primary object of the present invention to provide a lawn treating system which does not suffer the disadvantages and limitations of the prior art and which utilizes a conventional lawn sprinkling system as a component in the distribution system.

In this connection it is noted that previous devices and techniques have been proposed for using existing water sprinkling structures, whether permanently installed or whether attached to the end of a garden hose, to mix and spread fertilizers and insecticides. However, these devices have typically relied on such techniques as dripping the chemical into the water flow or using Venturi techniques to draw the chemicals into the water flow. Some of these devices have achieved some success but in each case, presently known, the device is not consistent in its mixing function; or its mixing proportions depend greatly upon the velocity of water in the mixing flow, the latter being typically a highly non-constant parameter. Furthermore, Venturi systems inherently require that the chemical be in a liquid state before the device can handle it. In addition, the mixing ratios are generally uncontrollable or unknown.

It is another object to provide a new lawn treatment system which achieves mixing of the chemicals with water in a controlled, precise, visible manner and in which the mixing is substantially self-regulating and does not depend upon water line pressure, velocity, temperature, or the like.

It is another object to provide such a system which may make use of water soluble salts and other solvents, such chemicals being often much more economical to purchase, store and handle.

It is another object to provide such a system which is automatic in its mixing, distributing, and self-cleaning functions.

It is another object to provide such a system which is inexpensive to manufacture, market and install.

It is another object to provide such a system which is mechanically rugged and simple in its operation.

It is another object to provide such a system, any above-ground components of which can be readily moved about the lawn and be concealed, if desired, by shrubs or other structures.

Briefly these and other objects and advantages are achieved in accordance with the structural features of one example of the invention which includes a throttling valve in series with the supply shut-off for a set of lawn sprinklers. Connected in shunt with the throttling valve is a series of components including a mixer inlet valve, a length of flexible hose, a mixing reservoir-gauge tank, a second length of flexible hose and a mixer outlet valve.

The reservoir-gauge tank is, in this example, approximately one gallon in capacity, is transparent, and is fitted, over its top portion, with a large mouth, pressure tight, removable lid. The tank is disposed on a ring stand having support rods protruding into the soil and may be placed at a distance from the throttling and mixing valves which are connected to the sprinkler feedline.

In operation the fertilizer or other chemical substances may be handily placed in the reservoir, the throttles and mixing valves adjusted, and the main sprinkler valve opened. That portion of the water shunted around the throttling valve passes through the mixing valves and the reservoir tank, mixes with the chemicals therein, and is then returned for mixing with the main stream of the sprinkling supply, downstream from the throttling valve, from whence it is distributed to the sprinkler head network.

Further details of these and other novel features and their principles of operation as well as additional objects and advantages of the invention will become apparent and be best understood from a consideration of the following description taken in connection with the accompanying drawing which is presented by way of an illustrative example only and in which:

FIGURE 1 is an overall view, partly in section, of an example of a lawn-treating system constructed in accordance with the principles of the present invention; and FIGURE 2 is a plan view in a schematic form, of a lawn treating sprinkler network constructed and installed in accordance with the invention.

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural details of the apparatus in more detail than is necessary for a fundamental understanding of the invention, the description taken with the drawing making apparent to those skilled in the arts of plumbing construction and plastics fabrication how the several forms of the invention may be embodied in practice. Specifically, the detailed showing is not to be taken as a limitation upon the scope of the invention which is defined by the appended claims forming, along with the drawing, a part of this specification.

In FIGURE 1 the example of the invention illustrated includes a set of coupling unions 10, 12 by which means the sprinkler feedline 14 has, in this example, been interrupted by the installation of the lawn treatment apparatus of the invention. The arrangement of the unions 10, 12 presupposes an installation of the instant system into an existing conventional lawn sprinkling system; accordingly, the unions 10, 12 may be deleted in the installation of a new overall lawn treatment system constructed in accordance with the structural principles of the present invention.

The union 10 is coupled to an elbow 16 which is in turn connected to a vertically disposed supporting nipple 18. The supporting nipple passes upwardly through the surface of the ground and is affixed supportingly to an anti-siphon device 20. This anti-siphon device is in this example a valve; however, its anti-siphoning function may be achieved without necessarily being an externally controllable valve. It has been included in practical systems as such because of its inexpensive availability on the plumbing supply market and because in accordance with the best standards of public and private health and safety it is deemed advisable to preclude any possible backflow of chemicals into the forward portion of the feedline 14 through the union 10 in the event of the sudden loss of pressure therein.

The output terminal of the anti-siphon device 20 is coupled to a nipple 22, a T connector 24 and a nipple 26 to a gate, throttling valve 28. The output port of the throttling valve 28 is in turn coupled through a nipple 30, a coupling T 32, a nipple 34, a valve member 96, a supporting nipple 38, an elbow 40, and a nipple 42 to the union 12 and thence back into the sprinkler feedline proper 14.

The throttling valve 28 is effectively by-passed by a series of components coupled in shunt around the throttling valve. The series of components include an input mixing gate valve 44 which is connected to the coupling T 24 as shown and a length of mixer input flexible hose 46. The hose is in this example common garden hose and its other end is coupled through an inlet fitting 48 to the body member 50 of a mixing-gauge tank 52. A fitting 48 is disposed at or near the bottom of the mixing-gauge tank 52 while an output fitting 54 is provided at or near the top of the body member 50 of the tank 52. An auxiliary drain cock 56 may be disposed as shown in a fitting 58 which is also disposed at or near the bottom of the tank body.

The top of the tank body is in this example fitted with a large mouth access opening 60 and a pressure supporting screw-on lid member 62. Depending upon the materials selected for the body member 50 and the lid member 62, a sealing gasket 64 may be provided, when desired, to assist in the pressure sustaining capability of the lid-body junction at the opening 60.

At the internal end of the fitting 54 a coarse filter screen 56 may be disposed in a frictionally held relationship whereby solids placed within the internal volume of the body member 50 may not be forced through the outlet fitting 54 and into an output flexible hose 70 and thence into the outlet mixing valve 72 which is connected in this example to the coupling T 32.

In a presently preferred practical example of the invention, the mixing-gauge tank 52 is fabricated of clear plastic and is accordingly transparent to the view of the user whereby the status of chemicals within the internal volume of the tank body and their flow out of the fitting 54 through the screen 66 may be observed during the utilization of the invention. In this example, the internal volume of the tank body member 50 is approximately one gallon. The body member 50 is further formed with a girth reinforcing and supporting shoulder 76 which extends about the periphery of the mid-section of the body member 50 in a manner to form a downwardly directed supporting shoulder 78.

To support the mixing-gauge tank 52 above the ground in a movable relation with respect thereto, a ring type support stand 80 is provided which includes a ring member 82 having an inner diameter which is equal to or slightly larger than that of the outer diameter of the tank body member 50 but which is supportingly engageable by the supporting shoulder 78 thereof in the manner shown. Affixed to the ring member 52 are a plurality of at least three supporting metal rods 84 with pointed tips 86 for impressing the support stand 80 securely into the ground wherever desired. The metal rods 84 are substantially parallel to each other and substantially perpendicular to the plane of the ring member 82. By these means, in cooperation with the lengths of flexible garden hose 46, 70, the mixing-gauge tank assembly may be disposed wherever desired on the grounds of the locale where the system is to be utilized without being vulnerable to collision as by children at play, or lawn mowing apparatus, or the like. In addition, it is esthetically advantageous to place the assembly within or behind shrubbery when possible.

The valve member 96 is of the character to divert, when desired, the mixed flow from the sprinkler network feedline 14 to a garden hose bib 98 and thence to a coupled flexible garden hose 100 for the watering, spraying, or feeding of lawn areas, shrubs, or planters where it is either not practical or is otherwise not desirable to do so by means of the sprinkler network 90. In this manner, full advantage of the automatic mixing capability of the invention may be taken, with the added versatility of specific and limited application of the mixed substance to a predetermined area or object.

Referring to FIGURE 2, the apparatus illustrated in FIGURE 1 is shown in a schematic manner as being interconnected within the sprinkler feedline 14 of an overall lawn sprinkling system which includes a main shutoff valve 88 and a network 90 of sprinkler heads 92. In correlating the structure illustrated in FIGURE 2 with that shown in structural detail in FIGURE 1 it may be noted that the anti-siphon device 20 is shown in the line 14 in a cascaded relationship with the shutoff valve 88. The input mixing valve 44 is in series with the length of input flexible line 46, the tank assembly 52 disposed within shrubberry 94, the outlet flexible hose 70, and the outlet mixing valve 72. The throttling valve 28 is again seen to be connected in a shunt relationship with the previously delineated series of components. It may also be noted that, when desired, particularly in new overall installations, the anti-siphoning device 20 may readily function as the manually controlled main shutoff for the network 90, the redundancy in such cases, otherwise, of the valve 20 in series with the main shutoff valve 88 being apparent.

In operation, with the water supply to the network 90 shutoff as at the anti-siphoning device 20, the lid member 62 is removed from the large mouth access opening 60. The drain cock 56 is then opened to remove all or at least a part of the residual water within the internal volume of the tank body member 50. The drain cock 56 is then closed and the prescribed amount and type of chemical is emplaced within the body member 50. The lid member 62 may then be replaced in a pressure sustaining manner over the access opening 60. With the inlet mixing valve 44, the throttling valve 28 and the outlet mixing valve 72 adjusted in accordance with prescribed instructions to provide the desired ratio of water flow through the gauge tank with respect to that which flows through the throttling valve 28 and which is all mixed together at the coupling T 32, the valve 20 may be opened. With the flow of water through the inlet mixing valve 44 and thence into the curved bottom of the mixing-gauge tank body member 50, the remaining air therein is forced along the system conduits, the chemical is thoroughly mixed with the incoming water, or dissolved, when solids are used, the mixture of chemical and water in solution or suspension is passed through the outlet mixing valve 72 and into the throttle feedline at the coupling 32.

Alternatively, and particularly for chemicals wherein the ratio of substance to water may be more critical, all valves may be closed, the body member 50 drained, the proper magnitude of chemical to be mixed with one gallon of water placed within the body member 50, the tank again sealed, the main valve 20 opened, and then the valves 44, 72 opened to permit the filling of the transparent tank with water. The valve 44 may be cracked to the extent desirable to achieve the filling of the tank in approximately one and a half minutes. The valve 72 may be opened substantially wider if desired. Knowing then that approximately 1½ minutes was required to fill the tank with one gallon of water, it may be fairly accurately, at least to a first approximation, assumed that an additional 1½ minutes will displace the internal volume of the body member 52 and force the liquid therein out into the network 90 of sprinkler heads 92. The throttling valve 28 may then be opened fully to force the mixture under full pressure and velocity to the individual heads 92 for final sprinkler distribution on the area to be treated.

There has thus been disclosed an example of a lawn treating system which achieves the objects and exhibits the advantages discussed hereinabove. In addition, it may be readily noted that the system is exceedingly versatile to all types of lawn treatment and is easily cleaned and maintained and is therefore relatively trouble-free and totally safe in its use and operation.

What is claimed is:
1. Lawn treating system adapted for use in combination with a lawn sprinkling system having a network shutoff valve, water sprinkling outlet means, and a sprinkler feedline interconnecting the valve and the sprinkling means, said lawn treating system comprising:
   throttling control valve means interconnected in series in said sprinkler feedline; and
   a series of mixer components interconnected in water flow communication in said feedline in shunt with said throttling control valve means,
   said series of mixer components including, in order:
      mixer input valve means,
      a first length of flexible hose,
      a pressure supporting reservoir-gauge tank assembly,
      a second length of flexible hose, and output mixer valve means, said pressure supporting reservoir gauge tank assembly comprising
      an at least partially transparent body member having a capacity of the order of at least a few quarts and having reinforcing and ring stand engaging girth shoulder means formed integrally therewith about its periphery,
      water pressure supporting inlet fitting disposed near the bottom thereof for removable connection to said first length of flexible hose,
      water pressure supporting outlet fitting disposed near the top thereof for removable connection to said second length of flexible hose,
      filter means carried thereby disposed contiguously to said output fitting in water filtering relation with respect to water passing therethrough whereby solid residues of greater than a predetermined size are rejected from passing through said second length of flexible hose, and
      pressure supporting-wide mouth access fitting means removably disposed contiguously to the top portion of said body member for placing chemical substances therewithin; and
      ring stand support comprising ring portion adapted to be horizontally disposed and to engage supportingly and removably said girth shoulder means of said body member, and
      at least three supporting post members affixed to said ring portion and depending therefrom and having earth surface penetrable end portions for supporting said ring portion above said earth surface.
2. The invention according to claim 1 which further includes:
   diversion control valve means connected to the output of said output mixer valve means and having a pair of output ports; a garden hose bib assembly having an input port connected to one of said output ports of said diversion control valve, and an outlet port of the character for connection to flexible garden hose, the other of said output ports being connected to said sprinkler feedline, whereby said diversion control valve controls whether the output flow of said output mixer valve means is channeled to said flexible garden hose or to said sprinkler feedline.

(References on following page)

References Cited

UNITED STATES PATENTS

| | | | |
|---|---|---|---|
| 1,830,769 | 11/1931 | Rothermal | 248—156 |
| 2,631,061 | 3/1953 | Nelson | 239—276 |
| 2,682,428 | 6/1954 | Roberts | 239—317 |
| 2,841,060 | 7/1958 | Coppage | 239—310 |
| 3,140,720 | 7/1964 | Griswold | 239—70 |

FOREIGN PATENTS

| | | |
|---|---|---|
| 15,972 | 1894 | Great Britain. |
| 18,928 | 8/1909 | Great Britain. |
| 237,089 | 7/1925 | Great Britain. |

EVERETT W. KIRBY, *Primary Examiner.*

M. HENSON WOOD, Jr., *Examiner.*

R. S. STROBEL, *Assistant Examiner.*